United States Patent
Lin et al.

(10) Patent No.: US 10,698,383 B1
(45) Date of Patent: Jun. 30, 2020

(54) METHOD OF LOAD CHARACTERISTIC IDENTIFICATION AND ACCELERATION ADJUSTMENT FOR MACHINE TOOL

(71) Applicant: INDUSTRIAL TECHNOLOGY RESEARCH INSTITUTE, Hsinchu (TW)

(72) Inventors: Jheng-Jie Lin, Taichung (TW); Kuo-Hua Chou, Zhubei (TW); Chien-Chih Liao, Taichung (TW); Jen-Ji Wang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/352,097

(22) Filed: Mar. 13, 2019

(30) Foreign Application Priority Data

Jan. 3, 2019 (TW) .............................. 108100152 A

(51) Int. Cl.
  *G05B 19/404* (2006.01)
  *B23Q 15/013* (2006.01)
  (Continued)

(52) U.S. Cl.
  CPC ......... *G05B 19/404* (2013.01); *B23Q 15/013* (2013.01); *B23Q 15/12* (2013.01); *G05B 19/406* (2013.01); *G05B 19/4163* (2013.01)

(58) Field of Classification Search
  CPC ........ G05B 19/404; B23Q 15/013; H02P 5/48
  See application file for complete search history.

(56) References Cited

U.S. PATENT DOCUMENTS

| 5,256,951 | A  | 10/1993 | Nashiki et al. |
| 6,438,445 | B1 | 8/2002  | Yoshida et al. |

(Continued)

FOREIGN PATENT DOCUMENTS

| CN | 1781659 A   | 6/2006 |
| CN | 101231517 A | 7/2008 |

(Continued)

OTHER PUBLICATIONS

Taiwanese Office Action and Search Report dated Jun. 5, 2019 for Application No. 108100152.

*Primary Examiner* — Eduardo Colon Santana
*Assistant Examiner* — Cortez M Cook
(74) *Attorney, Agent, or Firm* — Birch, Stewart, Kolasch & Birch, LLP

(57) ABSTRACT

A method of load characteristic identification and acceleration adjustment for a machine tool is provided. A first acceleration of a transmission system is set according to the weight of a workpiece, and the working platform and the workpiece are driven at the first acceleration. A first elastic deformation of the transmission system and an amount of first position error of the transmission system are calculated when transmission system is moved at the first acceleration. A dynamic error is calculated according to the first elastic deformation and the first position error. When the dynamic error is less than or greater than a target error, a second acceleration is set to the transmission system, and a second elastic deformation and a second position error are calculated when the transmission system moves at the second acceleration unit the dynamic error is converged to the target error.

6 Claims, 7 Drawing Sheets

(51) Int. Cl.
*H02P 5/48* (2016.01)
*G05B 19/406* (2006.01)
*B23Q 15/12* (2006.01)
*G05B 19/416* (2006.01)

(56) References Cited

U.S. PATENT DOCUMENTS

| | | |
|---|---|---|
| 7,902,780 B2 | 3/2011 | Okita et al. |
| 2015/0352679 A1* | 12/2015 | Yamamoto ......... G05B 19/4061 73/865.8 |
| 2016/0239017 A1 | 8/2016 | Noda et al. |

FOREIGN PATENT DOCUMENTS

| | | |
|---|---|---|
| CN | 102043876 A | 5/2011 |
| EP | 0 913 229 B1 | 1/2005 |
| TW | I336821 B | 2/2011 |
| TW | I400591 B1 | 7/2013 |
| TW | M467530 U | 12/2013 |
| TW | I435517 B | 4/2014 |
| TW | 201640895 A | 11/2016 |
| TW | I634777 B | 9/2018 |
| WO | WO 98/41357 A1 | 9/1998 |

\* cited by examiner

| Estimated weight (Kg) | Amount of elastic deformation (μm) | Maximum position error (μm) | Maximum dynamic error (μm) | Optimal acceleration (mm/s$^2$) |
|---|---|---|---|---|
| 0 | 0 | 12 | 12 | 919 |
| 258.5 | 1.56 | 10 | 11.56 | 848 |
| 474.9 | 2.61 | 9 | 11.61 | 772 |
| 729.9 | 3.62 | 8 | 11.62 | 696 |
| 973.7 | 4.3 | 8 | 12.3 | 619 |

FIG. 9

METHOD OF LOAD CHARACTERISTIC IDENTIFICATION AND ACCELERATION ADJUSTMENT FOR MACHINE TOOL

This application claims the benefit of Taiwan application Serial No. 108100152, filed Jan. 3, 2019, the disclosure of which is incorporated by reference herein in its entirety.

TECHNICAL FIELD

The disclosure relates in general to an acceleration adjustment method for a machine tool, and more particularly to a method of load characteristic identification and acceleration adjustment for a machine tool.

BACKGROUND

At present, the main functions of the machine tool include high-speed and high-precision cutting. With the rapid development of the controller, adjusting the axial machining parameters can make the machine tool meet the requirements of high-speed and high-precision. However, the parameters that the manufacturers of the machine tool initially adjust in the factory will change in the actual application due to the weight of the workpiece, which will influence the speed and precision of the machine tool. In addition, under the condition of knowing or estimating the weight of the workpiece, the operator can adjust the parameters of the machine tool within a certain working range through the trial and error method. However, the above adjustment method is time-consuming and needs to be adjusted by the operator manually and repeatedly, which affects the overall work efficiency.

SUMMARY

The disclosure is directed to a method of load characteristic identification and acceleration adjustment for a machine tool, which can temporarily set an acceleration parameter according to the weight of the workpiece, and then start the operation of the machine tool to actually calculate the elastic deformation and the amount of feedback position error of the transmission system. After completing multiple feedback controls, the system can automatically obtain the relationship between the acceleration parameter and the weight of the workpiece to find an optimized acceleration parameter.

According to one embodiment, a method of load characteristic identification and acceleration adjustment for a machine tool is provided, which is suitable for applying in the machine tool, wherein the machine tool includes a transmission system and a working platform, and the method includes the following steps. A first acceleration of the transmission system is set according to the weight of the workpiece, and the working platform and the workpiece are driven at the first acceleration. An amount of first elastic deformation of the transmission system is calculated according to the weight of the workpiece when the transmission system moves at the first acceleration. An amount of first position error of the transmission system is calculated according to the feedback position signal of the transmission system when the transmission system moves at the first acceleration. A dynamic error is calculated according to the amount of first elastic deformation and the amount of first position error, and it is determined that whether the dynamic error is equal to a target error, and a second acceleration is set to the transmission system when the dynamic error is less than or greater than the target error, and an amount of second elastic deformation and an amount of second position error of the transmission system are calculated when the transmission system moves at the second acceleration until the dynamic error is converged to the target error.

BRIEF DESCRIPTION OF THE DRAWINGS

FIG. 9 is a table showing the relationship between the weight of the workpiece, the amount of elastic deformation, the maximum position error, the maximum dynamic error, and the optimum acceleration.

Figure 1:
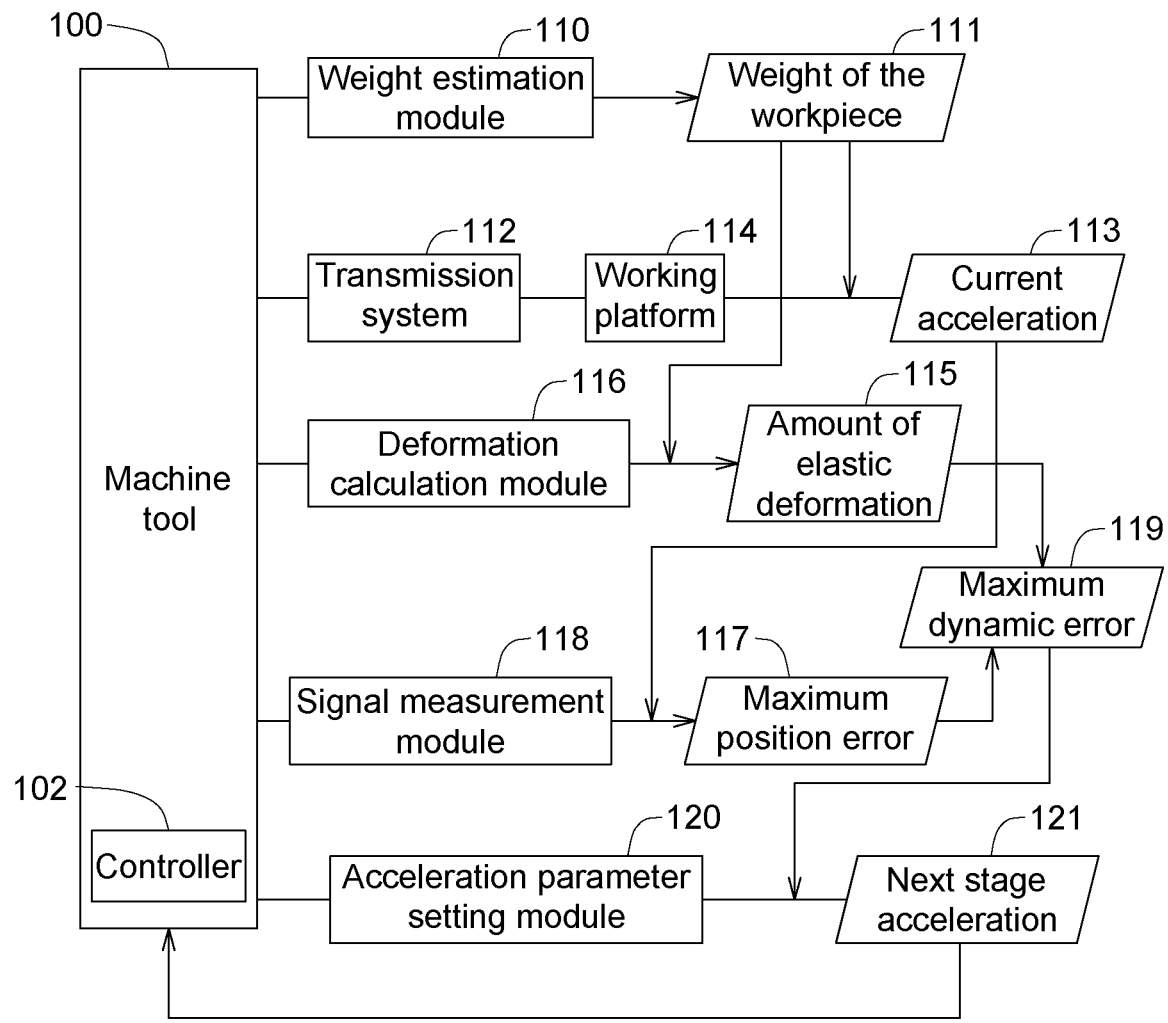
FIG. 1 is a schematic diagram of an operating system of a machine tool according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Details are given in the non-limiting embodiments below. It should be noted that the embodiments are illustrative examples and are not to be construed as limitations to the claimed scope of the present disclosure. The same/similar denotations are used to represent the same/similar components in the description below. Directional terms such as above, under, left, right, front or back are used in the following embodiments to indicate the directions of the accompanying drawings, not for limiting the present invention.

According to an embodiment of the present disclosure, a method of load characteristic identification and acceleration adjustment for a machine tool is provided, which can be applied in a computer numerical control (CNC) machine by means of software, hardware or a combination thereof. The method can be implemented in the machine, for example, a lathe or a milling machine of single-axis or multi-axis machining, thereby the axial acceleration parameters can be adjusted in accordance with the machining conditions. The settings of the axial acceleration parameters are related to the weight of the workpiece and the feedback controls of the motor current, the feed speed, and the position error. The method in the embodiment can automatically evaluate the weight of the workpiece and calculate the amount of elastic deformation and the amount of feedback position error of the transmission system to find out the relationship between the acceleration parameters and the weight of the workpiece, so as to adjust the axial acceleration parameters that best meet the machining conditions.

The amount of elastic deformation is, for example, the elastic deformation of the transmission system caused by the load weight of the workpiece, that is, the elastic deformation of the screws, nuts, bearings, shaft couplings and the like of the transmission system when the machine tool is loaded. In general, the higher the load weight of the workpiece, the higher the amount of elastic deformation, as shown in FIG. 9.

Referring to FIG. 1, according to an embodiment of the present disclosure, when a method of load characteristic identification and acceleration adjustment is applied in a machine tool 100, for example, the machine tool 100 may include a weight estimation module 110, a transmission system 112, a working platform 114, a deformation calculation module 116, a signal measurement module 118, and an acceleration parameter setting module 120. The weight estimation module 110 is used to estimate the weight 111 of a workpiece. The transmission system 112 is controlled by a controller 102. The working platform 114 is disposed on the transmission system 112 for carrying the workpiece and is driven by the transmission system 112. The deformation calculation module 116 is used to calculate an amount of elastic deformation 115 of the transmission system 112. The signal measurement module 118 is used to measure the electrical signals of the transmission system 112, such as the current signal, the feed speed, the axial acceleration, the position signal, and the amount of position error of the motor. The acceleration parameter setting module 120 is used to set an optimal acceleration parameter.

Figure 2:
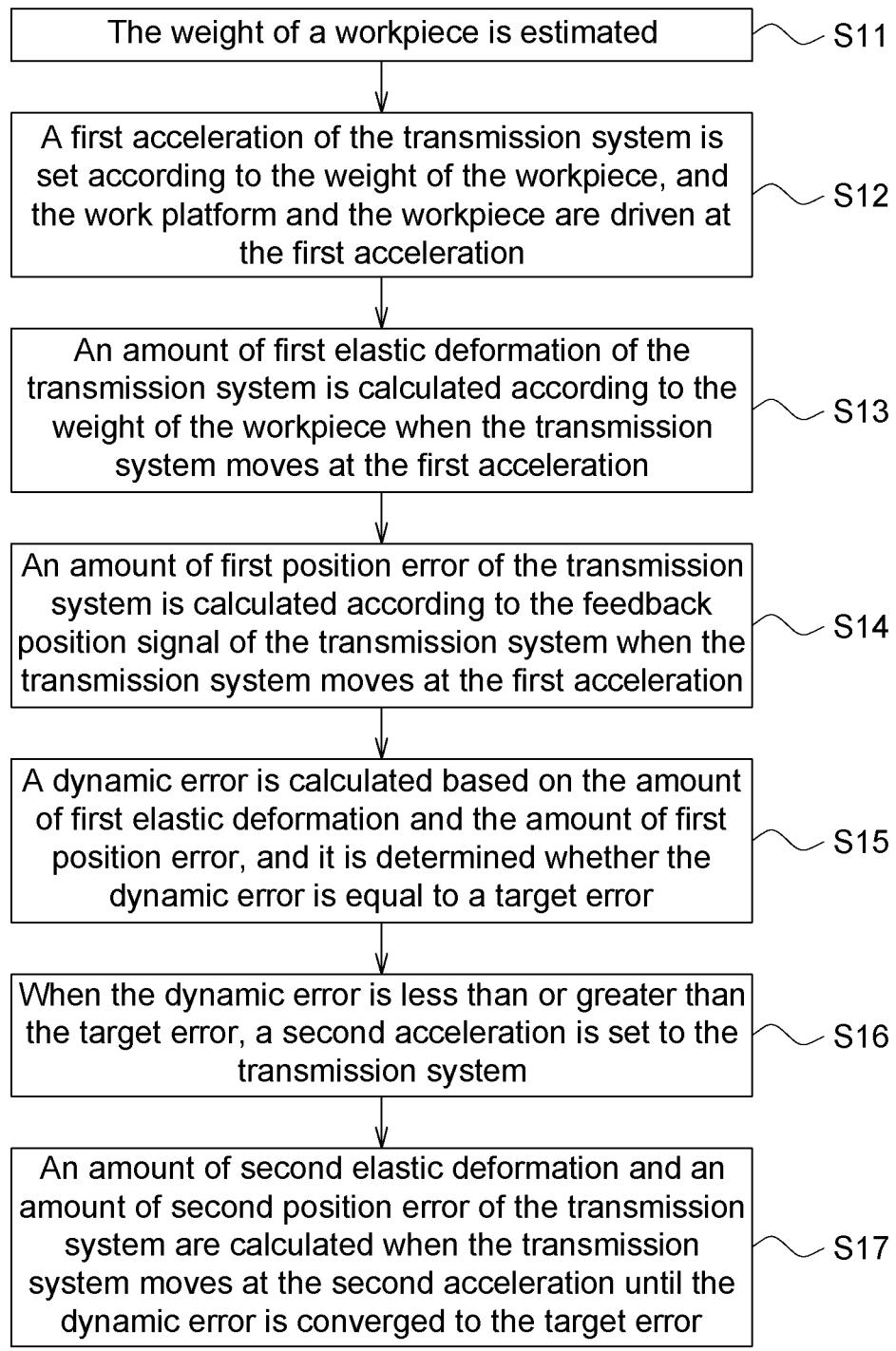
FIG. 2 is a schematic diagram showing a load characteristic identification and acceleration adjustment method for a machining tool according to an embodiment of the present disclosure.

Referring to FIGS. 1 and 2 together, the method of load characteristic identification and acceleration adjustment applied in the machine tool of the present disclosure may include the following steps S11-S17. In step S11, the weight 111 of a workpiece is estimated. In step S12, a first acceleration of the transmission system 112 is set according to the weight 111 of the workpiece, and the work platform 114 and the workpiece are driven at the first acceleration. In step S13, an amount of first elastic deformation 115 of the transmission system 112 is calculated according to the weight 111 of the workpiece when the transmission system 112 moves at the first acceleration. In step S14, an amount of first position error of the transmission system 112 is calculated according to the feedback position signal of the transmission system 112 when the transmission system 112 moves at the first acceleration. In step S15, a dynamic error is calculated based on the amount of first elastic deformation and the amount of first position error, and it is determined whether the dynamic error is equal to a target error. When the dynamic error is equal to the target error, the current acceleration is used as an optimization parameter. In step S16, when the dynamic error is less than or greater than the target error, the acceleration parameter setting module 120 sets a second acceleration to the transmission system 112. In step S17, the transmission system 112 drives the working platform 114 and the workpiece at the second acceleration, and the deformation calculation module 116 and the signal measurement module 118 calculate an amount of second elastic deformation and an amount of second position error of the transmission system 112 when the transmission system 112 moves at the second acceleration until the dynamic error is converged to the target error.

Referring to FIG. 1, in step S11, the weight estimation module 110 can estimate the weight 111 of the workpiece according to the current signal of the motor. For example, the transmission system 112 drives the working platform 114 to move a fixed distance along the axial direction (for example, from point A to point B) under a no-load condition. Then, the transmission system 112 drives the work platform 114 to move a fixed distance along the axial direction (for example, from point A to point B) in the case of loading the workpiece. The no-load current $T_0$ and the load current $T_1$ of the motor are respectively calculated when the transmission system 112 is under no-load or load condition to establish the relationships between the weight 111 of the workpiece and the no-load current $T_0$ and the load current $T_1$.

Figure 3A:
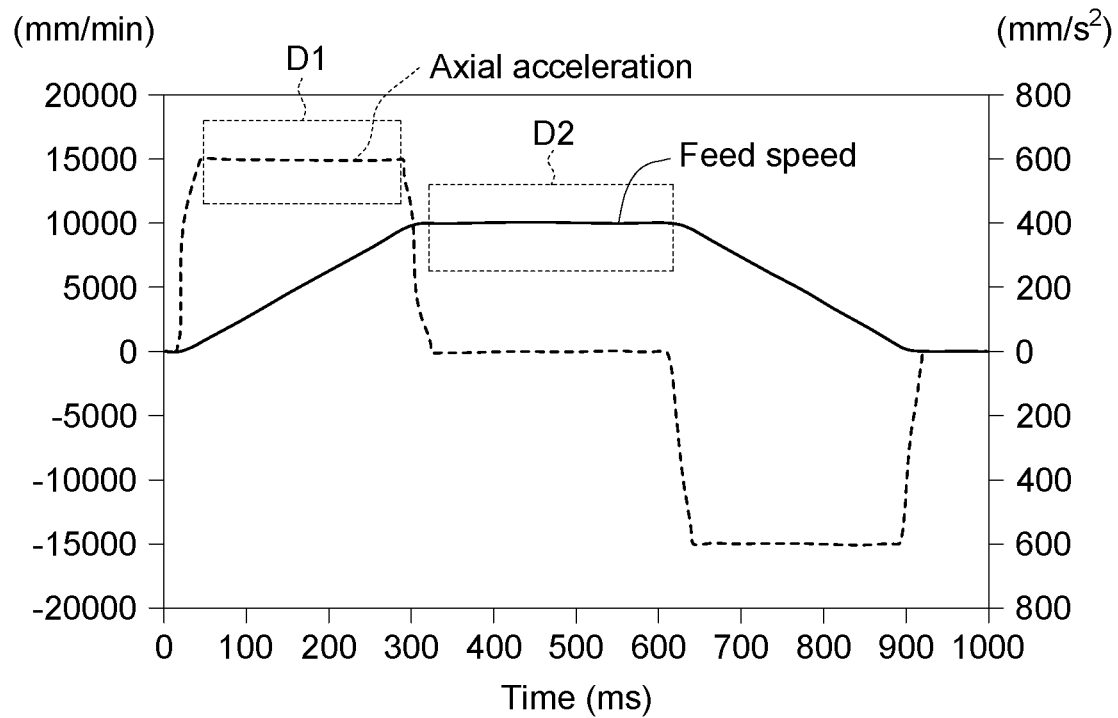
FIG. 3A is a schematic diagram showing the axial acceleration and the feed speed of the transmission system of the machine tool.
Figure 3B:
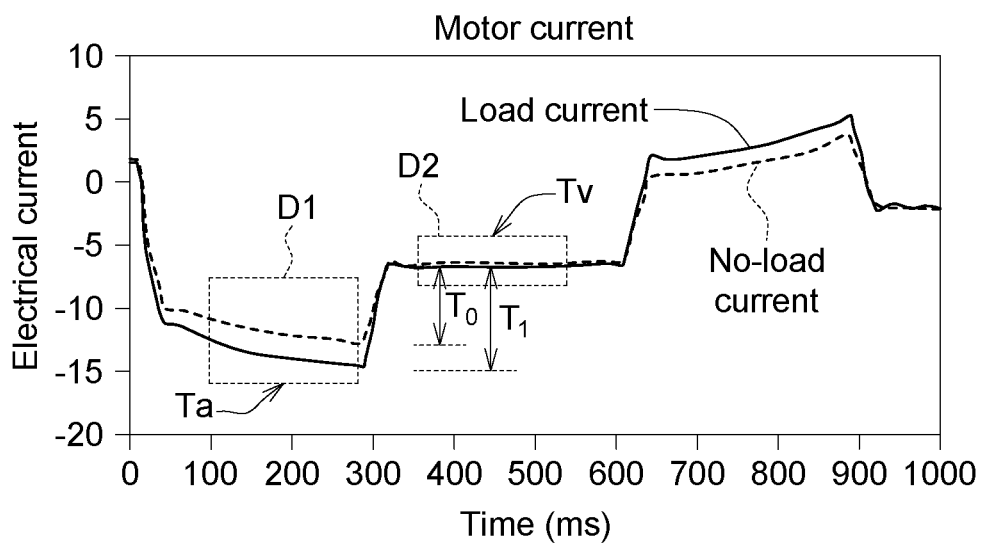
FIG. 3B is a schematic diagram showing estimating the weight of the workpiece according to the no-load current and the load current of the machine tool.

Refer to FIGS. 3A and 3B, a steady current signal in the constant acceleration time region D1 is defined as a constant acceleration average current signal Ta, and a steady current signal in the constant velocity time region D2 is defined as a constant velocity average current signal Tv. The no-load current $T_0$ and the load current $T_1$ are obtained by using the relationship of T=Ta−Tv. The no-load current T0 and the load current T1 are taken into the relationship of $$K(T_1 - T_0) = \Delta M \times A \times \frac{P}{2\pi},$$

and the weight 111 of the workpiece can be estimated accordingly, where ΔM is the difference of load weight before and after loading (i.e., the weight 111 of the workpiece), A is the axial acceleration, p is the thread pitch, and K is the torque constant. The relevant content is described as follows.

When the servo motor of the transmission system 112 drives the working platform 114 to generate a linear motion, the torque (τ) when the servo motor is accelerated needs to overcome the inertia (J) of the transmission system 112, the load torque ($T_{load}$) and the friction torque ($T_f$) required for the linear motion of the working platform 114, a is the angular acceleration, which is expressed by the following equation:

$$T = J \times \alpha + T_{load} + T_f \qquad (1)$$

The load torque ($T_{load}$) in the above equation (1) indicates that the torque of one rotation of the servo motor is equivalent to the force (F) to the work platform 114 when the work platform 114 is pushed to linearly move a thread pitch, and the force (F) is determined by the weight 111 of the workpiece and the axial acceleration A of the work platform 114, as indicating in the following equations (2) and (3):

$$T_{load} \times 2\pi = F \times \text{pitch} \qquad (2)$$

$$F = \Delta M \times A \qquad (3)$$

In the above equation (1), when the servo motor drives the working platform 114 and the workpiece at a constant velocity, the load torque ($T_{load}$) is zero, and the angular acceleration a is zero. Therefore, the torque at the constant velocity of the motor is equal to the friction torque ($T_f$). That is, $\tau = T_f$.

In order to accurately obtain the load weight (ΔM), it is necessary to confirm the stability, reliability and reproducibility of the electrical signal of motor. Since the transmission system 112 is subjected to have a position error (Error)

when the servo motor is instantaneously accelerated or decelerated (jerk), the servo circuit receives the position error (Error) and compensates for the position error when the servo motor is accelerated constantly, so as to converge the position error (Error) to zero. The steady electrical signal is judged by the area where the position error (Error) is equal to zero. Therefore, in this embodiment, a steady current signal (i.e., Ta) in the constant acceleration time region D1 and a steady current signal (i.e., Tv) in the constant velocity time region D2 can be selected to calculate the no-load current $T_0$ and the load current $T_1$.

Since the transmission system 112 is unchanged before and after loading of the working platform 114 when the servo motor drives the working platform 114 to generate a linear motion, the torque at the load current ($T_1$) subtracts the torque at the no-load current (To) and thus the inertia (J) of the transmission system 112 and the friction torque ($T_f$) are offset in the equation (1). Therefore, the relationship of the equation (1), $$K(T_1 - T_0) = \Delta M \times A \times \frac{P}{2\pi},$$

can be obtained, and the weight 111 ($\Delta M$) of the workpiece can be calculated using the relationship of the equation (1).

Figure 4:
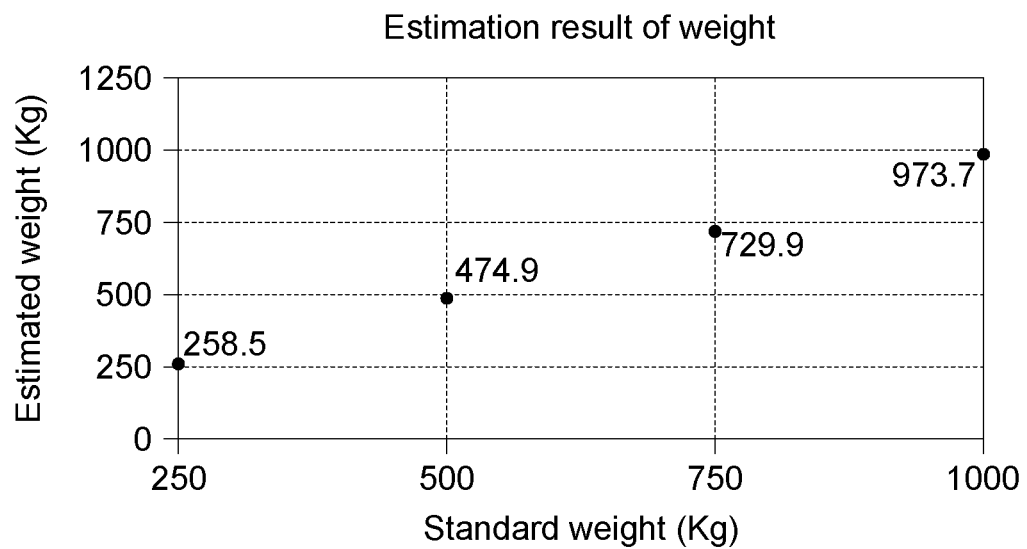
FIG. 4 is a schematic diagram showing the results of weight estimation.
Figure 5:
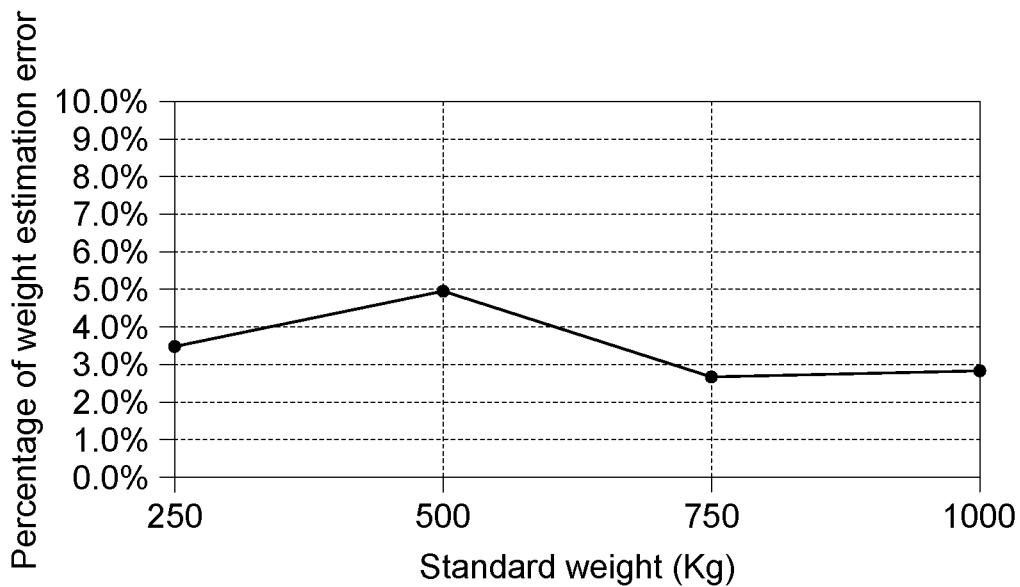
FIG. 5 is a schematic diagram showing the percentage of weight estimation error.

Referring to FIG. 4 and FIG. 5, the weight of the workpiece is simulated with four loads of standard weight (each 250 kg), and measure the no-load current ($T_0$) and the load current ($T_1$) on the working platform 114 when the working platform 114 is loaded by 250 kg, 500 kg, 750 kg or 1000 kg according to the above steps to estimate the weight 111 ($\Delta M$) of the workpiece. The result of weight estimation and the percentages of weight estimation error of the workpieces are shown in FIG. 4 and FIG. 5, when it is estimated by a load block of 250 kg, the estimated result is 258.5 kg with an error of 3.4%; when it is estimated by a load block of 500 kg, the estimated result is 474.9 kg; when it is estimated by a load block of 750 kg, the estimated result is 729.9 kg; and when it is estimated by a load block of 1000 kg, the estimated result is 973.7 kg, and the estimation error can be controlled at 2%-10%.

By using the no-load current ($T_0$) and the load current ($T_1$) of the motor to estimate the weight 111 of the workpiece, the system can meet the requirements of automated process, reducing the time and loading of the adjustment of the operator to improve the overall work efficiency. However, in another embodiment, the method of estimating the weight 111 of the workpiece is not limited to the manner described above, and the weight 111 of the workpiece may also be measured using a scale.

Figure 6:
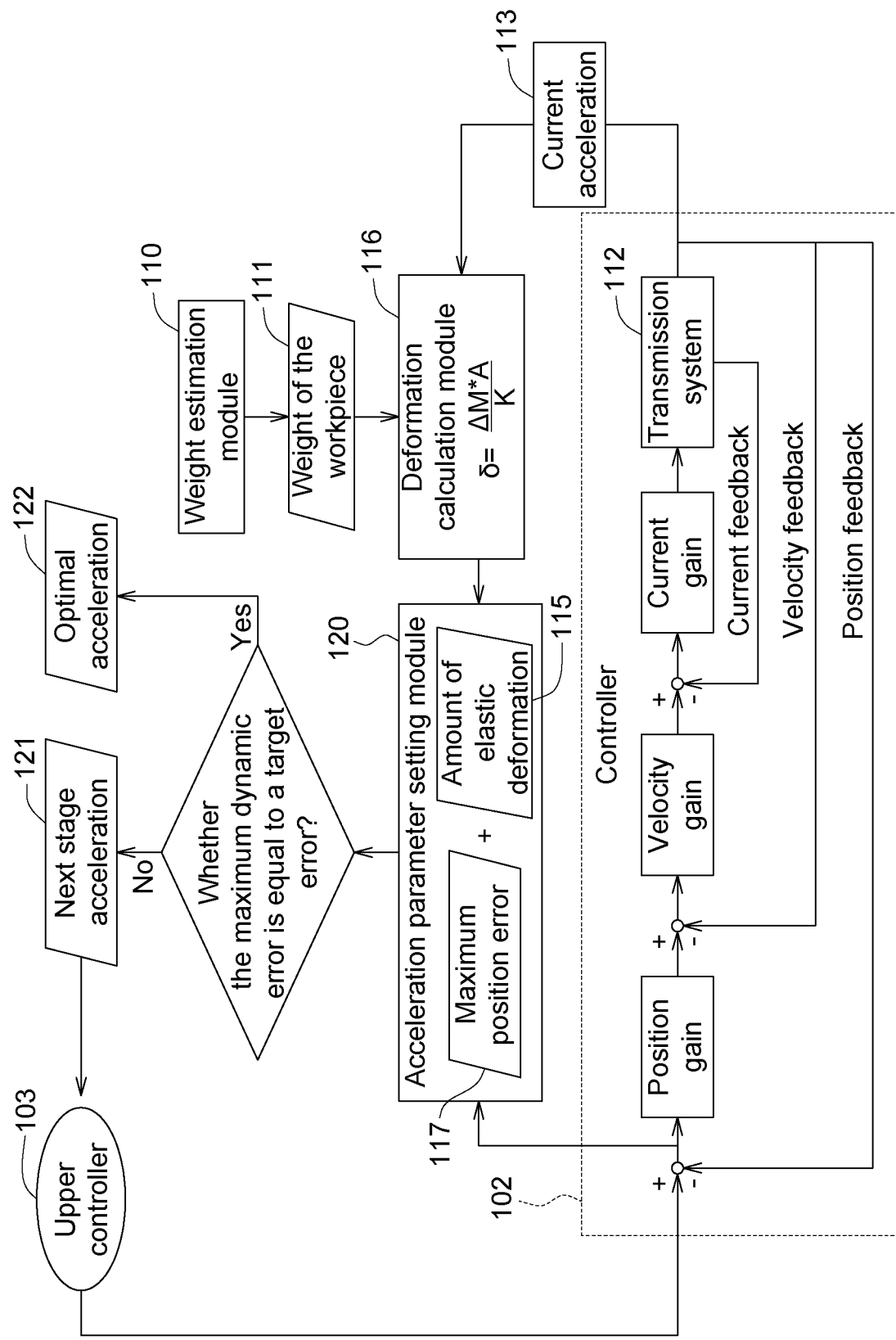
FIG. 6 is a schematic diagram showing the optimum acceleration parameters of the machine tool through feedback control.

Referring to FIGS. 2 and 6, in step S12, the controller 102 can set a first acceleration (that is, the current acceleration 113) of the transmission system 112 according to the weight 111 of the workpiece, and drive the working platform 114 and the workpiece at the first acceleration. In an embodiment, the controller 102 can set the first acceleration according to initial machining parameters of the machine tool 100 or user-customized parameters.

Then, in step S13, the deformation calculation module 116 can calculate the amount of first elastic deformation, that is, the amount of elastic deformation 115 ($\delta$), of the transmission system 112 according to the weight 111 of the workpiece when the transmission system 112 moves at the first acceleration. In step S14, the signal measurement module 118 can calculate the amount of first position error of the transmission system 112, that is, the largest one of the position errors 117, according to the feedback position signal of the transmission system 112 when the transmission system 112 moves at the first acceleration. In step S15, the acceleration parameter setting module 120 may calculate a dynamic error, that is, a maximum dynamic error 119, according to the amount of first elastic deformation 115 and the amount of first position error, and determine whether the dynamic error is equal to a target error ($E_G$).

Figure 7:
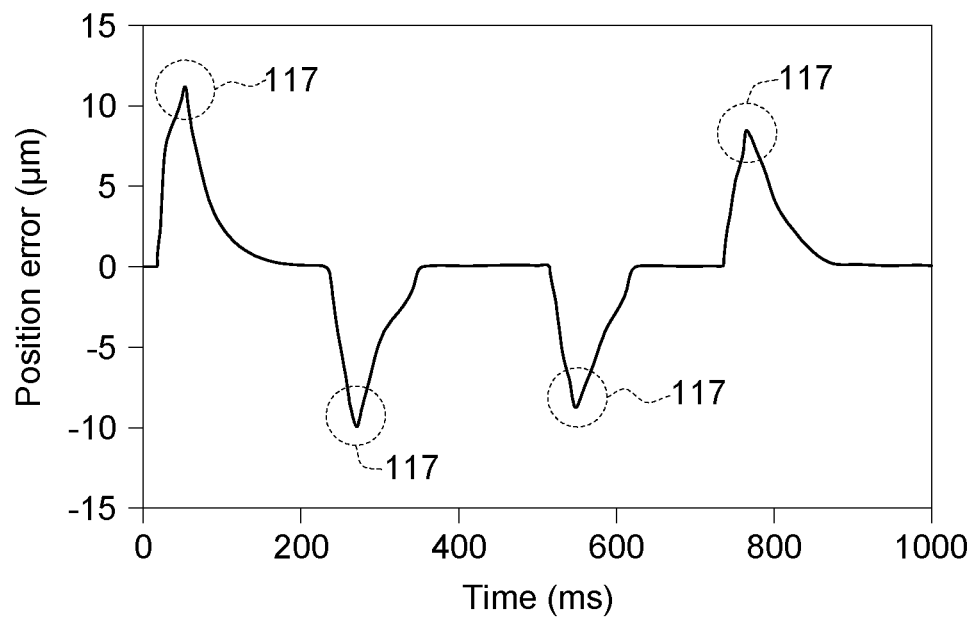
FIG. 7 is a schematic diagram showing the calculation of the maximum position error based on the feedback position signal.

Please refer to FIG. 7. The position error 117 will be affected by the acceleration. When the acceleration changes, the position error will also increase. When the acceleration is zero, the position error will converge to zero. In FIG. 7, the maximum position error is the leftmost position error 117.

As shown in FIG. 9, the sum of the amount of elastic deformation 115 ($\delta$) and the maximum position error 117 is the maximum dynamic error 119, and when the maximum dynamic error 119 is equal to the target error ($E_G$), it indicates that the current acceleration 113 is the optimum acceleration 122. When the maximum dynamic error 119 is less than or greater than the target error ($E_G$), it indicates that the current acceleration 113 is not the optimal acceleration 122, and therefore a second acceleration ($A_2$) must be calculated based on the maximum dynamic error 119 (Error), the current acceleration ($A_1$), and the target error ($E_G$). The relationship of the accelerations $A_1$ and $A_2$ is shown as follows:

$$A_2 = A_1 \times \frac{E_G}{\text{Error}}.$$

In step S16, the acceleration parameter setting module 120 sets a second acceleration to the transmission system 112 according to the above relationship. That is, the ratio of the second acceleration to the first acceleration is equal to the ratio of the target error ($E_G$) to the dynamic error.

In step S17, the transmission system 112 drives the working platform 114 and the workpiece at a second acceleration, and the amount of elastic deformation 115 ($\delta$) and the maximum position error 117 of the transmission system 112 are calculated when the transmission system 112 moves at the second acceleration to determine whether the maximum dynamic error 119 is equal to the target error ($E_G$). If the maximum dynamic error 119 is still not equal to the target error ($E_G$), then the feedback control is performed to obtain the next stage acceleration 121 again until the dynamic error is converged to the target error.

Referring to FIG. 6, which shows a schematic diagram of the machine tool 100 to find the optimized acceleration parameter through the feedback control. The deformation calculation module 116 calculates the amount of elastic deformation 115 ($\delta$) of the transmission system 112 based on the weight 111 of the workpiece. According to Hooke's law and Newton's second law of motion, the steel of transmission system 112 can be regarded as a linear elastic material in engineering application, its elastic coefficient is K, the transmission system 112 is subjected to the force during the acceleration of the motor, and the force and the amount of elastic deformation 115 ($\delta$) are in a linear relationship. Since the force is equal to the product of the load mass of the transmission system 112 and the acceleration, the relationship between the amount of elastic deformation 115 ($\delta$) and the weight of the workpiece 111 ($\Delta M$) is as follows: $\delta = (\Delta M \times A)/K$.

In FIG. 6, the weight 111 (ΔM) of the workpiece is inputted to the deformation calculation module 116, and the amount of elastic deformation 115 (δ) of the transmission system 112 at the current acceleration 113 is calculated according to the above relationship. Then, the acceleration parameter setting module 120 determines whether the current acceleration 113 is the optimal acceleration 122 according to the difference between the sum of the amount of elastic deformation 115 (δ) and the maximum position error 117 and the target error. In addition, the upper controller 103 can transmit the parameters of the next stage acceleration 121 back to the servo loop of the controller 102, and the next stage acceleration 121 becomes the current acceleration 113 after the calculation of the current feedback, velocity feedback and position feedback. This cycle is continued until the maximum dynamic error 119 is converged to the target error ($E_G$).

Figure 8:
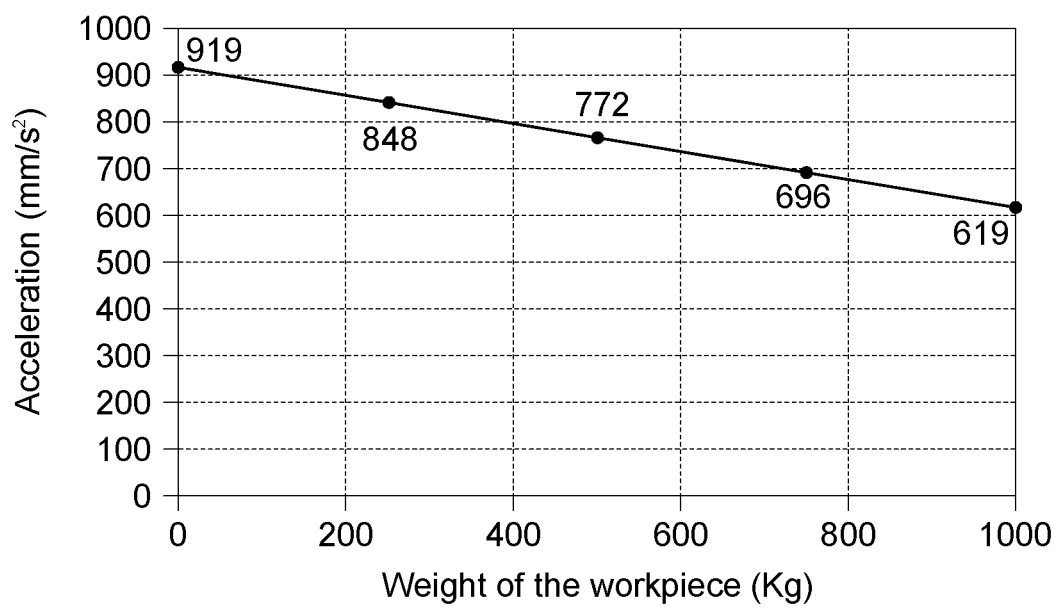
FIG. 8 is a schematic diagram showing the relationship between the weight of the workpiece and the acceleration.

Referring to FIG. 9, assuming that the target error ($E_G$) is equal to 12 μm, the acceleration parameter setting module 120 adjusts the optimal acceleration 122 according to the estimation results of weight 111 of the workpiece (258.5 kg, 474.9 kg, 729.9 kg and 973.7 kg). A table of the relationship between the weight 111 of the workpiece and the optimum acceleration 122 is shown in FIG. 8. In addition, according to FIG. 9, when the workpieces of different weights are applied for the target error ($E_G$), the larger the estimated weight of the workpiece, the larger the amount of elastic deformation 115 of the transmission system 112, and the smaller the optimum acceleration 122.

The machine tool and the method of acceleration control and adjustment thereof disclosed in the above embodiments of the present disclosure can temporarily set an acceleration parameter according to the weight of the workpiece, and then start the operation of the machine tool to actually calculate the elastic deformation of the transmission system and the amount of feedback position error. After completing multiple feedback control, the system can automatically obtain the relationship between the acceleration parameter and the weight of the workpiece to find the optimized acceleration parameter. Therefore, the control method of the embodiment can be applied to parameter adjustment of various machine tools and the controller thereof, and achieves the purpose of automatically adjusting the optimal acceleration parameter.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of load characteristic identification and acceleration adjustment for a machine tool, suitable for applying in the machine tool, wherein the machine tool comprises a transmission system and a working platform, the method comprising:
    setting a first acceleration of the transmission system according to a weight of a workpiece, and driving the working platform and the workpiece at the first acceleration;
    calculating, according to the weight of the workpiece, an amount of first elastic deformation of the transmission system when the transmission system moves at the first acceleration;
    calculating, according to a feedback position signal of the transmission system, an amount of first position error of the transmission system when the transmission system moves at the first acceleration;
    calculating a dynamic error according to the amount of first elastic deformation and the amount of first position error, and determining whether the dynamic error is equal to a target error, and setting a second acceleration to the transmission system when the dynamic error is less than or greater than the target error, and calculating an amount of second elastic deformation and an amount of second position error of the transmission system when the transmission system moves at the second acceleration until the dynamic error is converged to the target error.

2. The method according to claim 1, wherein before setting the first acceleration, the weight of the workpiece is estimated according to a current signal of a motor of the transmission system.

3. The method according to claim 2, wherein a no-load current and a load current of the motor is calculated according to a difference between an average current signal in a constant acceleration time region and an average current signal in a constant velocity time region.

4. The method according to claim 1, wherein before setting the first acceleration, the weight of the workpiece is measured by a scale.

5. The method according to claim 1, wherein a ratio of the second acceleration to the first acceleration is equal to a ratio of the target error to the dynamic error.

6. The method according to claim 1, wherein a product of the weight of the workpiece and the first acceleration is linear with the amount of elastic deformation.

* * * * *